United States Patent Office 3,536,557
Patented Oct. 27, 1970

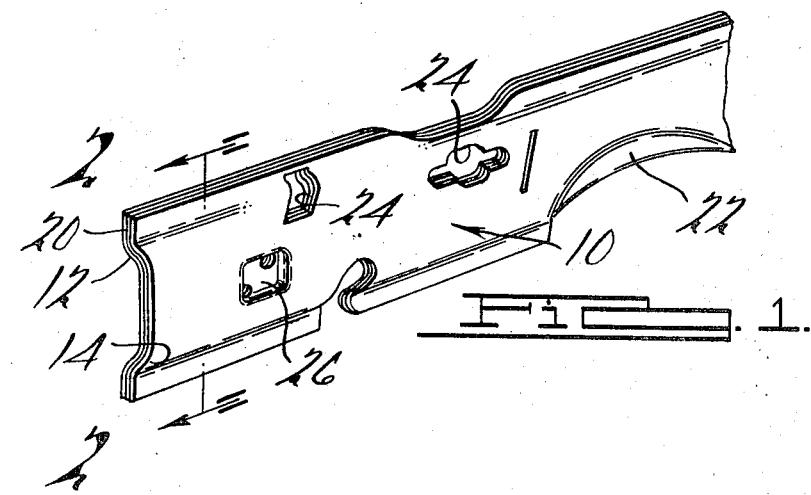

3,536,557
METHOD OF MAKING A COMPOSITE CONTOURED SOUND INSULATING PANEL
Edward G. Goldstone, Huntington Woods, Mich., assignor to Allen Industries, Inc., a corporation of Delaware
Filed July 14, 1967, Ser. No. 653,558
Int. Cl. B32b 11/00
U.S. Cl. 156—228                    8 Claims

ABSTRACT OF THE DISCLOSURE

A composite contoured sound insulating panel and process for making the panel in which a pair of fibrous pads are molded to impart thereto a mutually conforming preselected shape-retaining contour and wherein a substantially uniform layer of a heat liquefiable dense insulating material is applied on either one or both of the opposed mating surfaces of the pads and the pads are thereafter united in appropriate registry and are securely bonded to each other forming a unitary sound insulating panel. The composite panel can be die-cut or otherwise trimmed to a precise configuration including the provision of suitable apertures therethrough as may be desired, as well as provided with a barrier coating along the exposed edges of the panel to effect a sealing of the sound insulating substance.

BACKGROUND OF THE INVENTION

The increasing emphasis on passenger safety and comfort in transport vehicles has occasioned an increased use of various materials to further enhance the cushioning and sound insulating characteristics of passenger compartments. The use of such sound insulating and cushioning materials has been particularly pronounced in connection with automobiles which have effected material reductions in the transmission of engine and road noise into the passenger compartment. An important consideration in the use of such sound insulating and cushioning materials is the cost of the material and the ease by which it can be installed at selected locations adjacent to the panels defining the passenger compartment of a vehicle.

Various materials have heretofore been used or proposed for use which have not been entirely satisfactory because of their relatively high initial cost and/or the difficulty of installing the materials in a car. Equally important has been the deficiency of such materials in providing an effective sound insulating barrier without interfering with the installation and/or function of other operative components incorporated in the vehicle. The appearance of such insulating materials when disposed in locations visible to the driver and passengers has also left much to be desired in the past.

In automotive vehicles, which are exemplary of one use of the improved insulating panel comprising the present invention, a substantial reduction in the transmission of engine and road noise to the interior of the passenger compartment is accomplished by positioning a sound deadening material along the firewall and toe-board of the passenger compartment. The firewall or dash panel and toe-board are conventionally of a complex configuration and contour which has occasioned difficulty in the installation and retention of such insulating materials therealong. In addition, the lower portion of such insulating materials are, in some instances, visible to persons within the passenger compartment making it desirable that such materials are of a pleasing appearance consistent with the decor of the passenger compartment.

The improved sound insulating panel and the process of making the insulating panel in accordance with the present invention overcomes the disadvantages characteristic of materials of the types heretofore known providing a panel which is of low cost, simple manufacture, versatile use, effective performance and which can be provided with an attractive finish as may be desired.

SUMMARY OF THE INVENTION

The foregoing advantages and benefits of the present invention are achieved by forming an insulating panel employing a process by which a pair of fibrous pads of a preselected thickness are preliminarily molded to impart a mutually conforming shape-retaining contour therein of a preselected configuration and whereafter one or both of the mating opposed faces of the contoured pads are coated with a dense heat liquefiable insulating substance which, while still in a tacky condition, is united with the adjacent pad, effecting a tenacious bond therebetween and a unitary insulating panel. The resultant composite panel may be die-cut or otherwise trimmed, as desired, to a precise shape and size, and may additionally be provided with suitable apertures therethrough for providing access to components extending through the panel. It is further contemplated that the exposed edges of the dense insulating material can be provided with a suitable barrier coating, effecting a sealing thereof and all or a portion of the exposed face of the panel can be provided with a suitable decorative coating to enhance its appearance.

Further benefits and advantages of the present invention will become apparent upon a reading of the description of the preferred embodiments of the present invention, taken in conjunction with the accompanying drawing.

BRIEF DESCRIPTION OF THE DRAWING

FIG. 1 is a perspective view of a typical composite contoured insulating panel constructed in accordance with the preferred embodiments of the present invention;

FIG. 2 is a transverse sectional view through the insulating panel shown in FIG. 1 and taken substantially along the line 2—2 thereof;

FIG. 3 is a flow diagram of the steps employed in the process for making an insulating panel of the type shown in FIG. 1; and FIG. 4 is a side elevational view, partly diagrammatic, illustrating typical equipment for applying a uniform layer of the dense insulating material on the surface of a preliminary contoured fibrous pad.

DESCRIPTION OF THE PREFERRED EMBODIMENTS

Referring now in detail to the drawings and as may be best seen in FIGS. 1 and 2, a typical composite contoured insulating panel 10 is shown of a type suitable for use along the firewall and toe-board of an automobile passenger compartment. The sound insulating panel 10 is comprised of a pair of fibrous pads 12, 14, which are formed with a preselected shape-retaining contour therein and are disposed with the mating and conforming opposed faces 16, 18 in firm bonded contact with an intervening substantially uniform layer 20 of a dense sound insulating substance. The sound insulating panel 10 is provided with suitable peripheral contours, such as an arcuate flange 22, for accommodating the tunnel provided in the floor plan of a vehicle to provide clearance for the transmission and drive shaft. In addition, suitable apertures, indicated at 24, are die-cut or otherwise provided in the panel to provide access of other components, such as the steering column, brake pedal linkage, speedometer cable, etc., which pass through the firewall from the passenger compartment into the engine compartment. Suitable localized indentations, such as the indentation 26, can also be readily formed in the panel to correspond with similar configurations in the panel against which the insulating panel is disposed in contact. It will be understood that sound insulating panels having alternative contours and configurations can be satisfactorily made in accordance with the process of the present invention providing the same advantages and benefits as are achieved with the exemplary insulating panel illustrated in the drawings.

The fibrous pads 12, 14 comprise randomly arrranged fibers of any of the types well known in the art including those of animal, vegetable and synthetic origin. For the purposes of the present invention, it is only important that the fibers are in the form of elongated filaments possessing some inherent flexibility to enable the formation of a fibrous network which is porous and possesses some resiliency. The physical characteristics of the fibers preferably are such that they can be passed through a carding or garnetting apparatus to effect a combing and random orientation thereof, forming a fibrous batt without encountering any substantial breakage or disintegration of the fiber filaments. Generally, fibers which possess the foregoing requirements include naturally-occurring fibers of vegetable origins, such as cotton, hemp, jute, ramie, sisal, cellulose, abaca and the like. Typical naturally-occurring animal origin fibers include wool, silk, hair from cattle, horses and hogs, chicken feathers, etc.; while fibers of a synthetic origin include, for example, cellulose acetate, viscose rayon, nylon, vinylchloride, protein base fibers such as casein and soybean, etc. The formation of a continuous batt of the fibrous material is achieved in accordance with the techniques well known in the art such as, for example, by passing the fibers through a suitable carding or garnetting machine, whereafter they pass through a suitable lapper in which an overlapping of the resultant fibrous web is accomplished until a batt of the desired thickness is obtained. The resultant batt can be preliminarily treated with a suitable adhesive and compacted so as to form a pad of the requisite thickness and density from which pads of an appropriate configuration are cut and are thereafter subjected to a further molding operation in the presence of an additional binder to impart a preselected shape-retaining contour thereto. Alternatively, the loosely-matted, randomly-oriented fibrous batt from the lapping machine can be impregnated with a suitable binder and blanks thereof can be transmitted to a suitable molding operation, effecting a concurrent bonding of the fibers into an integral fibrous pad, while concurrently imparting a preselected shape-retaining contour thereto.

The binder material suitable for use in forming an integral batt in which the fibers are bonded to each other at their points of contact as well as the retention of the resultant batt in a suitable precontoured configuration may include any of those well known in the art which are compatible with the chemistry of the fibers employed and which provide a tenacious bond of the fibers and a contouring of the pad over the temperature and humidity conditions to which the panel is to be subjected during use. Binders which have been found eminently satisfactory for this purpose include any one of a variety of thermoplastic and thermosetting resinous materials, as well as various glues of animal and vegetable origin. The particular adhesive employed for bonding the fibers to each other and/or for retaining the contour of the preshaped batt or pad is not critical. Suffice it to say the binder is selected which will provide good adhesion of the fibers to each other and shape retention of the resultant precontoured pad and which is of relatively low cost and easy application and handling.

Of the various binder materials employed, synthetic thermosetting binders have been found to be particularly satisfactory such as phenol aldehyde resins, urea resins, melamine resins or the like, of which the condensation product of phenol with formaldehyde constitutes a preferred material. In addition, various lattices either of natural or synthetic rubber, as well as synthetic resin lattices such as acrylic, urethane, vinyl or the like, can also be satisfactorily employed. In addition to the foregoing, conventional animal and vegetable base glues can be used of the various types well known in the art.

The binder material conventionally is applied to the web as it emerges from the garnetting machine and passes into the lapper, whereafter the resultant batt is passed through a curing oven in which the batt is compressed to a preselected thickness between a pair of moving pervious conveyors and a bonding of the fibers occurs. The resultant batt is thereafter cut into appropriate shaped blanks and can be further molded by the addition of further adhesive into a pad of a preselected configuration. Conventionally, the pads are formed so as to have a resultant density of from about one to about four ounces per square foot and may be of a thickness generally ranging from about ⅛ to about 1½ inches. The thickness of the pad can vary consistent with the degree of compression thereof in localized areas during the molding of the pad to a desired contour.

The resultant pads are arranged in pairs and at least one of those opposed mating surfaces, having mutually conforming contours, is coated with a dense heat liquefiable material so as to provide a substantially uniform coating or layer thereon. The sequence of operations is schematically illustrated by the flow diagram as shown in FIG. 3. After a coating of one or both mating surfaces of the pads, and while the insulating coating still retains a tacky surface, the pads are united in appropriate registry, forming a lamination in which the two pads are bonded by the intervening layer of sound insulating material. After the lamination, the panel is subjected to a further trimming operation, as desired, to provide an accurate peripheral configuration.

The dense heat liquefiable insulating substance preferably comprises a material which is solid at room temperature but which will liquefy when heated to a temperature below that at which any thermal degradation of the fibers of which the pads are comprised will occur when the heated coating is applied to one or both faces thereof. The coating also is of a substance which is of a relatively low cost and of the various materials suitable for this purpose, bituminous base materials such as asphalt are particularly satisfactory. The dense insulating substance may additionally include suitable extenders or filler materials of low cost to further enhance the economy of the coating, as well as its density and ability to absorb sound. The inclusion of a filler material also serves the purpose of retarding the penetration of the liquefied layer into the fibrous pad. Conventionally, the bituminous base insulating substance may contain from about 30% to about 80% by weight of a suitable filler such as, for example, powdered slag, slate flour, by ash, limestone or other finely particulated low cost extender materials. It will be understood that the term "sound insulating substance" or "bituminous material" or "asphalt material," as herein employed, is intended to cover the dense insulating substance, as well as the extenders or filler materials contained therein.

The insulating substance, which preferably comprises asphalt containing an appropriate filler material, is heated to an elevated temperature so as to effect a liquefying thereof and a reduction in its viscosity, enabling application thereof in the form of a liquid coating to the opposed contoured mating surfaces of the pads. Conventionally, most filled asphaltic-type materials suitable for this purpose contain small proportions of volatile materials including solvent material and will liquefy to an appropriate viscosity at temperatures generally ranging from about 300° F. to about 400° F. The application of the dense sound insulating substance is preferably achieved in accordance with the apparatus as illustrated in FIG. 4, including a curtain coater comprising a nozzle 28 from which a continuous curtainous stream 30 of the asphaltic material is extruded and that which is not deposited on the pad surfaces is received in a return trough 32 from which it is returned to a heating tank and back to the nozzle 28. Suitable conveyors, indicated at 34 and 36, are provided for conveying the precontoured pad, indicated at 38, in a direction from the left to the right, as viewed in FIG. 4. The adjacent ends of the conveyors 34, 36 are spaced from each other to provide a gap through which the curtainous stream 30 can pass into the return trough 32 when a pad 38 is not disposed therebelow.

Conventionally, the pads 38 are passed through the curtainous stream 30 at a uniform speed and in one direction such that a substantially uniform layer of the heated and liquefied insulating substance is applied thereon. In order to prevent a puddling of the liquefied insulating substance or a tendency of the material to run downwardly along surfaces other than horizontal surfaces, it is desirable to provide a chamber 40 positioned immediately above the conveyor 36 from which a suitable cooling medium is applied to the insulating substance, effecting a cooling or chilling thereof and increase in its viscosity to a level at which the puddling tendency thereof is substantially reduced. Suitable cooling media may comprise, for example, compressed air, carbon dioxide or water, of which the latter constitutes the preferred material. When a cooling liquid such as water is employed, it is preferred that the cooling chamber 40 additionally incorporate compressed air jets, such as the nozzle 42, through which a jet of air is directed against the coating for removing the excess water from the surface of the insulating layer.

In accordance with the preferred practice of the present invention, a layer of the dense insulating substance is applied to each of the opposed mating faces of the precontoured pads and is subsequently chilled upon passing beneath the cooling chamber 40. Preliminary to bonding the two pads to each other, it is necessary in order to achieve a tenacious bond to subject the opposed surfaces of the dense insulating substance to a reheating, such as by exposure to infra-red lamps, to again render the surfaces tacky. It is also contemplated that two or more passes of the pads through the curtainous stream of insulating material can be made. In such instances, it is preferred, particularly when panels are of a substantially irregular contour, to pass the panels in opposite directions through the curtainous stream, whereby greater uniformity in the thickness of the coating is attained, particularly on surfaces disposed to the lee of projections. Conventionally, the first layer is preliminarily chilled and thereafter substantially dried prior to passing the precoated pad through a second or multiple coating operation. The multiple coating operation can simply be achieved by reversing the direction of operation of conveyors 34, 36 and the provision of a second cooling chamber 44, as shown in FIG. 4, or alternatively, by an in-line operation in which the pads are rotated in a horizontal plane through 180° prior to entering the second curtainous stream (not shown).

In either even, the dense sound insulating material is applied in an amount usually ranging from about 5 to about 30 ounces per square foot which can be varied to provide the requisite sound insulating characteristics consistent with the intended end use of the insulating panel. As previously mentioned, the lamination of the pad is accomplished with at least a portion of the exposed surface of the dense insulating substance in a tacky condition to assure a tenacious bonding thereof with the mating surface of the other pad or with a similar coating of insulating material thereon. The lamination can simply be achieved by positioning the pads in appropriate registry in a suitable press, after which the pads are united and retained in that position for a sufficient time to assure intimate contact of the opposed surfaces forming an integral panel. The resultant panel, if desired, is subjected to a trimming or die-cutting operation, at which time an accurate sizing and squaring of the terminal edges is achieved, as well as the provision of suitable apertures such as the apertures 24 in the panel shown in FIG. 1.

It is also contemplated that the exposed edges of the insulating layer 20 can be coated with a suitable impervious protective coating which serves as a barrier layer preventing further volatilization of any solvents in the bituminous layer which may tend to condense on the windows and other appointments of the interior of the passenger compartments. The provision of such a protective layer also facilitates a handling of the insulating panels during subsequent shipment, storage and installation and prevents adherence thereof to the carpeting or other interior trim materials disposed in contact therewith. Protective coatings of the types suitable for this purpose include film-forming natural or synthetic resins which provide a substantially impervious coating and are compatible with the asphaltic material over which it is applied. The protective coating may be applied in the form of an aqueous emulsion or suspension or, alternatively, in a solvent system incorporating a relatively volatile solvent to facilitate evaporation thereof. Examples of suitable protective coatings include a phenolic resin dissolved in an alcohol solvent and an acrylic water emulsion which can readily be applied to the terminal edges as well as the edges formed by the apertures through the panel in a manner so as to deposit a substantially impervious film thereover. Conventionally, the thickness of the film can be as thin as about one mil to provide for an impervious barrier.

It is further contemplated that all or a portion of one or both of the exposed faces of the composite insulating panel can be provided with a suitable decorative finish if desired. Conventionally, such decorative finishes may include suitable dyes or pigments of the desired color, as well as a film-forming material to enhance the finished appearance of the exposed portions of the insulating panel. Typical of the various finishing materials that can be satisfactorily employed are natural and/or synthetic latices incorporating dyes or pigments therein which are applied such as by a spray to all or a portion of the surfaces of the panel as desired.

While it will be apparent that the invention disclosed herein is well calculated to fulfill the objects above stated, it will be appreciated that the invention is susceptible to modification, variation and change without departing from the proper scope or fair meaning of the subjoined claims.

What is claimed is:
1. The method of making a composite contoured sound insulating panel which comprises the steps of molding a pai rof fibrous pads to impart a mutually conforming preselected shape-retaining contour therein, applying a bituminous base heat liquefiable dense sound insulating substance in the form of a layer on at least one of the mating surfaces of said pads in an amount of from about 5 ounces to about 30 ounces per square foot by passing at least one of said pads through a curtainous stream of said substance, superimposing said pads with said mating surfaces in appropriate registration and with the exposed surface of said sound insulating substance in a tacky condition, and thereafter uniting said pads and effecting a tenacious bonding thereof to each other by the intervening said layer of said sound insulating substance forming a composite contoured panel.

2. The method as defined in claim 1, wherein said insulating substance is applied in the form of a substantially uniform layer on each of said mating surfaces of said fibrous pads.

3. The method as described in claim 1, further characterized by the step of trimming the resultant composite contoured panel to a precise configuration including the formation of apertures therethrough at preselected positions.

4. The method as described in claim 1, wherein said layer of said insulating material is applied by passing at least one of said pads through a curtainous stream of the heat liquefied said material and immediately thereafter cooling said layer to increase the viscosity thereof to a magnitude which restricts the flow thereof.

5. The method as described in claim 1, characterized by the step of applying a protective coating to the edges of said panel over the exposed edges of said layer of said insulating substance.

6. The method as defined in claim 4, characterized by the step of passing said pad through said curtainous stream a second time and in a direction opposite to that of the first pass.

7. The method as defined in claim 4, characterized by the further step of reheating the surface of said insulating layer before uniting said pads together to render said layer adhesively tacky to enhance the bonding thereof.

8. The method as described in claim 4, wherein the step of cooling said layer is accomplished by spraying a cold fluid against the surface thereof.

References Cited
UNITED STATES PATENTS

| | | | |
|---|---|---|---|
| 1,941,491 | 1/1934 | Robinson | 156—243 |
| 1,814,532 | 7/1931 | Sutherland | 156—214 |
| 2,318,272 | 5/1943 | Weigle et al. | 156—242 |
| 2,466,966 | 4/1949 | Prance et al. | 156—214 |
| 2,938,822 | 5/1960 | Nelson | 156—228 |
| 3,015,597 | 1/1962 | Lambert | 156—280 |
| 3,211,600 | 10/1965 | Motycka | 156—214 |
| 3,193,437 | 7/1965 | Schafer | 156—245 |
| 3,242,510 | 8/1966 | Goldstone | 156—214 |
| 3,389,749 | 6/1968 | Towns et al. | 156—245 |

REUBEN EPSTEIN, Primary Examiner

U.S. Cl. X.R.

156—242, 280